Oct. 13, 1925. Re. 16,184

M. L. HOEFFKEN

TURNTABLE

Original Filed May 8, 1922 2 Sheets-Sheet 1

Inventor:
Maurice L. Hoeffken

By Harry A. Beiner
Attorney

Oct. 13, 1925. Re. 16,184

M. L. HOEFFKEN

TURNTABLE

Original Filed May 8, 1922 2 Sheets-Sheet 2

Inventor:
Maurice L. Hoeffken

By Harry A. Beinus
Attorney.

Reissued Oct. 13, 1925. Re. 16,184

UNITED STATES PATENT OFFICE.

MAURICE L. HOEFFKEN, OF BELLEVILLE, ILLINOIS.

TURNTABLE.

Original No. 1,428,090, dated September 5, 1922, Serial No. 559,291, filed May 8, 1922. Application for reissue filed November 3, 1923. Serial No. 672,671.

*To all whom it may concern:*

Be it known that I, MAURICE L. HOEFFKEN, a citizen of the United States, residing at Belleville, county of St. Clair, State of Illinois, have invented new and useful Improvements in Turntables, of which the following is a specification.

My invention has relation to improvements in turntables for trucks, and consists in the novel features of construction more fully set forth in the specification and pointed out in the claims.

In the building of new roads the road material is brought up to the end of the road on which the men are working, by trucks. And, since the concrete mixer is placed just beyond the finished part of the road, it is necessary to turn the truck carrying material for the mixer so as to dump said material directly into or near the mixer. Turntables are employed for this purpose owing to the lack of space (road-bed width) for turning otherwise. As these turntables are generally constructed, the approach at each end consists of an apron which is thrown back out of the way when turning the table. These aprons are unsatisfactory in that they take up room, and have to be held up out of the way when the end of the table passes the sides of the excavation or bank.

It is the object of the present invention to eliminate these aprons, which I do by making the table tiltable so that the truck can be run onto the table directly and off again, the table being readily balanced with its load for turning. The manner in which this object is accomplished, as well as other objects, will be better apparent from a detailed description of the invention in connection with the accompanying drawings, in which—

Figure 1:
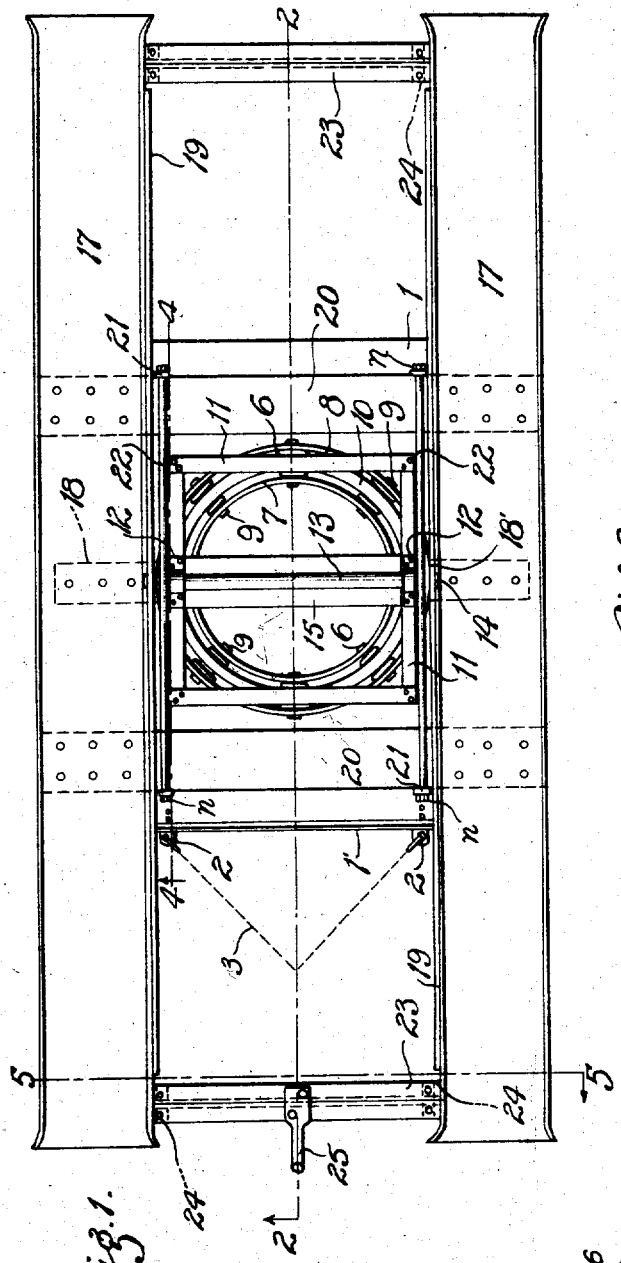
Figure 2:
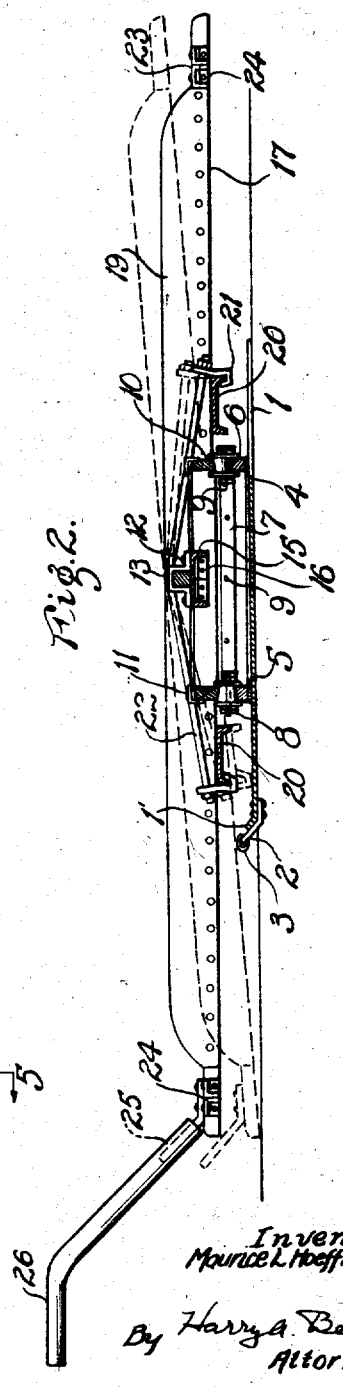
Figure 3:
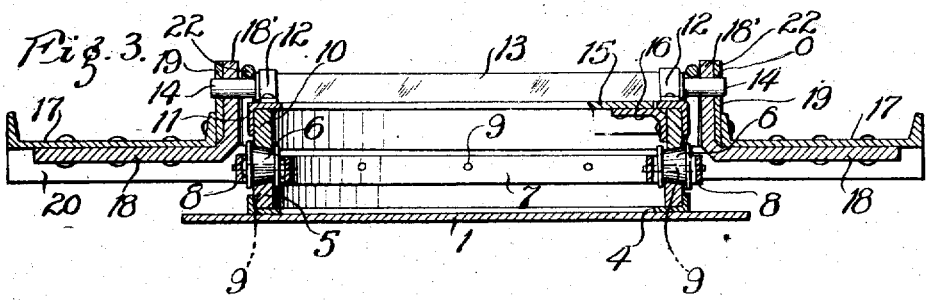
Figure 4:
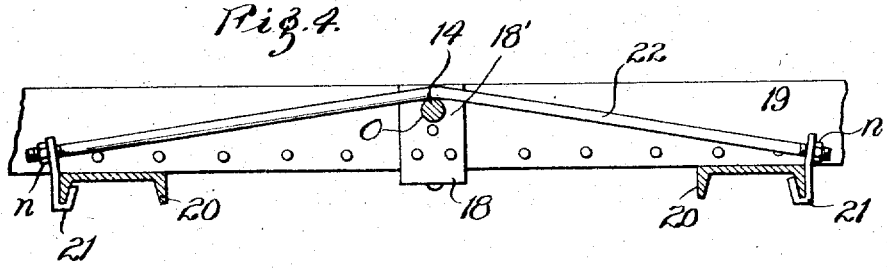
Figure 5:
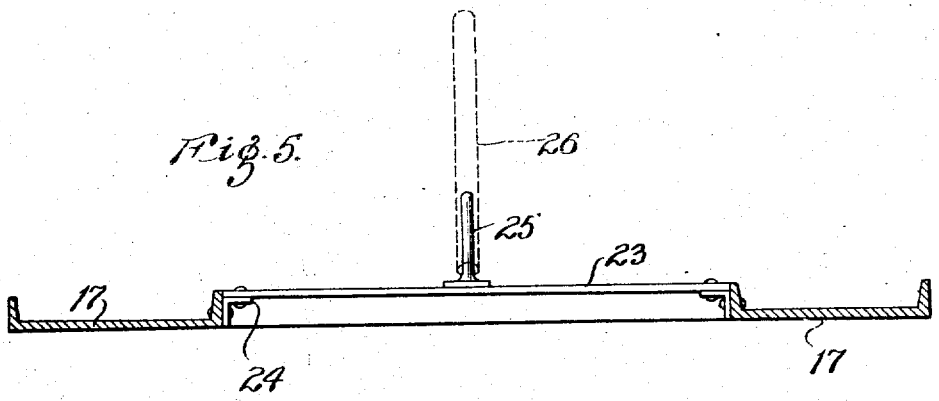

Figure 1 is a plan view of my improved turntable; Fig. 2 is a middle longitudinal section through the same; Fig. 3 is a middle transverse section through the table; Fig. 4 is a longitudinal section on the line 4—4 of Fig. 1 with the ends of the track broken away; and Fig. 5 is a cross-section taken on the line 5—5 of Fig. 1.

Referring to the drawings, 1 represents a base-plate, the forward edge 1′ of which is turned up and provided with a pair of fingers 2, 2 in spaced relation, each finger being perforated to receive one end of a chain 3 by which the turntable can be moved along. The base-plate 1 has a rectangular angle frame 4 secured to its upper face, said frame confining a circular track 5 in place, on which are mounted rollers 6, 6, etc., said rollers being held in place by a cage consisting of an inner ring 7 and an outer ring 8, both of which are perforated to receive the ends of pins 9 passing through the rollers. A circular track 10 is mounted on the rollers 6, said track carrying a rectangular angle frame 11 to which is secured by straps 12, 12 a square axle 13 terminating at both ends in trunnions 14, 14. The medial part of the axle rests on a channel 15 spanning across the diameter of the upper track 10, to which it is secured by angle brackets 16, 16. A pair of tracks 17, 17 are oscillatably supported on the trunnions 14, 14 through the agency of brackets 18, 18, which are riveted transversely to the bottom of each track at the center, said brackets having vertical legs 18′, 18′, each of which is provided with a hole 0 for receiving a trunnion 14. A guide plate 19 is secured to the inner leg of each channel track 17, and the tracks are connected on opposite sides of the roller bearings by channels 20, 20. Hooked under the outer legs of both channels 20 adjacent to the tracks 17 are perforated fingers 21, and a tie-rod 22 is passed through the perforated fingers 21 on opposite channels, said rod bearing down on the axle 13 and held securely in place by nuts *n*, *n* passed over the ends of the rod. The tracks 17, 17 are held together near the ends by angle bars 23, 23 secured to the inner leg of the tracks by brackets 24, 24. A lever arm 25 is riveted to one of these bars, said lever inclining upwardly, and a pipe handle 26 is passed over the arm 25 when it is desired to turn the turntable.

The operation of my invention may be briefly described as follows:

The truck carrying the road material is driven forwardly onto the turntable, which is tilted downwardly in front of the truck (dotted position, Fig. 2) and centered so that the load will be in equilibrium or nearly so on the tracks. With the load thus balanced the operator places the pipe handle over the lever 25 and pushes the turntable around a half-circle. With the load balanced it is a comparatively easy matter to turn the table on the roller bearings. The load is now dumped and the truck driven off the table forwardly. When it is desired to advance the turntable the chain 3 is connected to a source of power, and the table dragged to a new position. The turning up of the end 1′ of the base 1 permits the base to pass over the ground without digging in.

Having described my invention, I claim:

1. A turntable provided with a stationary base, a table revolubly mounted on said base, and a pair of tracks tiltably supported by said table, said tracks being tiltable in any position of the table.

2. A turntable provided with a stationary base, a frame revolubly mounted on said base, and a supporting member tiltably mounted on a frame, said supporting member being tiltable independently of a movement of the frame.

3. A turntable provided with a base, a frame revolubly mounted on said base, an axle positioned on said frame, and a supporting member tiltably mounted on said axle, independently of a movement of the frame.

4. A turntable provided with a base, a frame revolubly mounted on said base, an axle supported by said frame, a track mounted on each end of the axle and freely tiltable thereon, and structural members connecting the tracks.

5. A turntable provided with a base, a frame revolubly mounted on said base, an axle supported by said frame, a pair of tracks tiltably mounted on the axle, structural members connecting the tracks on opposite sides of the axle, and truss members extending from one of said members to the other and passing over the axle.

6. A turntable provided with a stationary base, a turntable element revolubly mounted on said base, a load supporting member mounted on the turntable element and freely tiltable in any position of the turntable element, and means for revolving said element.

7. A turntable provided with a base, roller bearings mounted on said base, a turntable element supported on said roller bearings, an axle mounted on the turntable element, a track disposed on each side of the turntable element, a bracket projecting upwardly from each track, said bracket being tiltably supported by the axle, means for revolving the turntable element, and means on the base-plate for coupling the same to a vehicle for moving the turntable.

8. A vehicle turntable provided with a stationary base, a table revolubly mounted on said base, and a pair of tracks tiltably supported by said table, said tracks themselves serving as a ramp for a vehicle mounting or leaving them at either end and in any position of the table.

Signed at Belleville, county of St. Clair, State of Illinois, this 24 day of October, 1923.

MAURICE L. HOEFFKEN.